(12) United States Patent
Tsai

(10) Patent No.: US 9,489,071 B2
(45) Date of Patent: Nov. 8, 2016

(54) ELECTRONIC APPARATUS AND DATA TRANSMISSION SYSTEM

(76) Inventor: Hsiung-Kuang Tsai, Taipei (TW)

( * ) Notice: Subject to any disclaimer, the term of this patent is extended or adjusted under 35 U.S.C. 154(b) by 0 days.

(21) Appl. No.: 14/344,056

(22) PCT Filed: Sep. 10, 2012

(86) PCT No.: PCT/CN2012/081171
§ 371 (c)(1),
(2), (4) Date: Mar. 10, 2014

(87) PCT Pub. No.: WO2013/037281
PCT Pub. Date: Mar. 21, 2013

(65) Prior Publication Data
US 2014/0220892 A1    Aug. 7, 2014

(30) Foreign Application Priority Data

Sep. 13, 2011 (WO) ............... PCT/CN2011/079576

(51) Int. Cl.
| | | |
|---|---|---|
| H04B 5/00 | (2006.01) | |
| G06F 3/041 | (2006.01) | |
| G06F 3/044 | (2006.01) | |
| H04W 4/00 | (2009.01) | |
| H04M 1/00 | (2006.01) | |
| H04B 1/38 | (2015.01) | |

(52) U.S. Cl.
CPC ............... *G06F 3/041* (2013.01); *G06F 3/044* (2013.01); *G06F 3/0412* (2013.01); *G06F 3/0416* (2013.01); *H04B 5/0031* (2013.01); *H04W 4/008* (2013.01); *G06F 2203/04101* (2013.01)

(58) Field of Classification Search
CPC .... G06F 3/044; H04B 5/0012; H04B 5/0031
USPC ................................................. 455/41.1, 566
See application file for complete search history.

(56) References Cited

U.S. PATENT DOCUMENTS

| | | | |
|---|---|---|---|
| 6,501,529 B1 * | 12/2002 | Kurihara ............. | G02F 1/13338 345/173 |
| 7,657,242 B2 * | 2/2010 | Floyd ........................... | 455/262 |
| 2006/0094411 A1 | 5/2006 | Dupont | |
| 2009/0153445 A1 | 6/2009 | Furuta et al. | |
| 2009/0275283 A1 | 11/2009 | Zhuyan | |

FOREIGN PATENT DOCUMENTS

| | | |
|---|---|---|
| CN | 2785540 Y | 6/2006 |
| CN | 201707209 U | 1/2011 |
| CN | 102013901 A | 4/2011 |

(Continued)

*Primary Examiner* — Eugene Yun
(74) *Attorney, Agent, or Firm* — Cheng-Ju Chiang

(57) ABSTRACT

An electronic apparatus is cooperated with an operation apparatus and includes a display panel and a transceiver module. The display panel has at least one electrode. The transceiver module has a transmission unit and a receiving unit. The information exchange between the electronic apparatus and the operation apparatus is performed by at least one of the following ways: the operation apparatus couples and receives a first data transmitted from the electrode, the transmission unit delivers a second data from the electronic apparatus to the operation apparatus, and the receiving unit receives a third data transmitted from the operation apparatus. A data transmitting system is also disclosed. Accordingly, a near field wireless data transmission, which can be applied to not only the near field transmission of data or file but also the far distance data transmission by cooperating with the current communication transmission system, is provided.

19 Claims, 4 Drawing Sheets

(56) References Cited

FOREIGN PATENT DOCUMENTS

| JP | 2003-324397 A | 11/2003 |
| JP | 2009-253478 A | 10/2009 |
| JP | 2011-61792 A | 3/2011 |
| KR | 10-0862578 B1 | 10/2008 |
| TW | M371930 U1 | 1/2010 |
| WO | 2006/087670 A1 | 8/2006 |

* cited by examiner

ELECTRONIC APPARATUS AND DATA TRANSMISSION SYSTEM

BACKGROUND OF THE INVENTION

1. Field of Invention

The present invention relates to an electronic apparatus and a data transmission system.

2. Related Art

In order to broaden the application field of the commercial electronic products, some products have been added with the new function of near field communication (or short range communication). The near field communication (or short range communication) system can provide a wireless connecting route from one electronic apparatus to another within a reachable operation region for transmitting information such as instructions, music, pictures, name cards, data or file. Except for providing the convenient communication function, they also increase the applications of electronic device in various areas such as the application of IC cards (e.g. access control, tickets or credit cards) or advertisement messages (e.g. receiving electric coupons from the monitor through Bluetooth).

The electronic products equipped with such near field communication function are the trend of market. Therefore, it is desired to provide a new electronic apparatus architecture with near field communication function such that more applications can be built over this data transmission routes.

SUMMARY OF THE INVENTION

An objective of the present is to provide an architecture of electronic apparatus as well as a data transmission system that provides a near field wireless data transmission, which can be applied to not only the near field transmission of data or file but also the far distance data transmission by cooperating with the current communication transmission system. For example, the electronic apparatus of this novel structure can transmit data or file to another electronic apparatus within a near field through signal coupling and then implement the desired data transmission by other communication approaches, thereby expending the application fields of the electronic apparatus.

The present invention can be implemented by the following technical proposals.

An electronic apparatus is cooperated with an operation apparatus and includes a display panel and a transceiver module. The display panel has at least an electrode. The transceiver module has a transmission unit and a receiving unit. Information exchange between the electronic apparatus and the operation apparatus is performed by at least one of the following ways: the operation apparatus couples and receives a first data transmitted from the electrode, the transmission unit delivers a second data from the electronic apparatus to the operation apparatus, and the receiving unit receives a third data transmitted from the operation apparatus.

In one embodiment, the electrode is an independent electrode of the display panel or one of plural row electrodes and column electrodes of the display panel.

In one embodiment, the operation apparatus or the electronic apparatus has another transceiver module, which comprising a wire/wireless local area network module, a Bluetooth module, a telecommunication network module, an RF module, or their combinations.

In one embodiment, when the operation apparatus approaches or touches the electronic apparatus, the first data is transmitted from the electrode of the display panel to the operation apparatus, or the second data is transmitted from the transmission unit to the operation apparatus.

In one embodiment, the transceiver module is disposed at one side of the electronic apparatus away from the display panel.

In one embodiment, the operation apparatus has another display panel, and a transmission data is coupled to the transceiver module of the electronic apparatus from at least an electrode of another display panel.

In one embodiment, the electronic apparatus comprises a cell phone, a tablet computer, a public information display, a billboard, an electronic white board, or a PDA.

To achieve the above objective, the present invention also discloses a data transmission system including an operation apparatus and an electronic apparatus. The electronic apparatus includes a display panel and a transceiver module. The display panel has at least one electrode, and the transceiver module has a transmission unit and a receiving unit. Information exchange between the electronic apparatus and the operation apparatus is performed by at least one of the following ways: the operation apparatus couples and receives a first data transmitted from the electrode, the transmission unit delivers a second data from the electronic apparatus to the operation apparatus, and the receiving unit receives a third data transmitted from the operation apparatus.

In one embodiment, the operation apparatus has at least one signal transmission terminal, which includes a dock connector, an HDMI connector, a mini display port, a USB, a micro USB, an AV connector, a power input terminal, or any of their combinations, for connecting other peripheral apparatuses.

In one embodiment, the operation apparatus includes an independent CPU and an independent operation system.

In one embodiment, when the operation apparatus approaches or touches the electronic apparatus, the first data is transmitted from the electrode of the display panel to the operation apparatus, or the second data is transmitted from the transmission unit to the operation apparatus.

In one embodiment, the data transmission system further includes a sensing apparatus. When a user operates on the display panel, a fourth data is coupled to the sensing apparatus through the user.

In one embodiment, the sensing apparatus delivers a fifth data to the electronic apparatus or the operation apparatus.

In one embodiment, the operation apparatus includes a docking station, a cell phone, a tablet computer, a personal computer, a user, or a PDA.

As mentioned above, the information exchange between the electronic apparatus and the operation apparatus of the invention is performed by at least one of the following ways: the operation apparatus couples and receives a first data transmitted from the electrode, the transmission unit delivers a second data from the electronic apparatus to the operation apparatus, and the receiving unit receives a third data transmitted from the operation apparatus. Accordingly, a near field wireless data transmission, which can be applied to not only the near field transmission of data or file but also the far distance data transmission by cooperating with the current communication system, is provided. In one embodiment of the invention, the electronic apparatus of this architecture can transmit data or file to another electronic apparatus within a short distance through signal coupling and then implement the desired data transmission by other communication approaches, thereby expending the application fields of the electronic apparatus.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
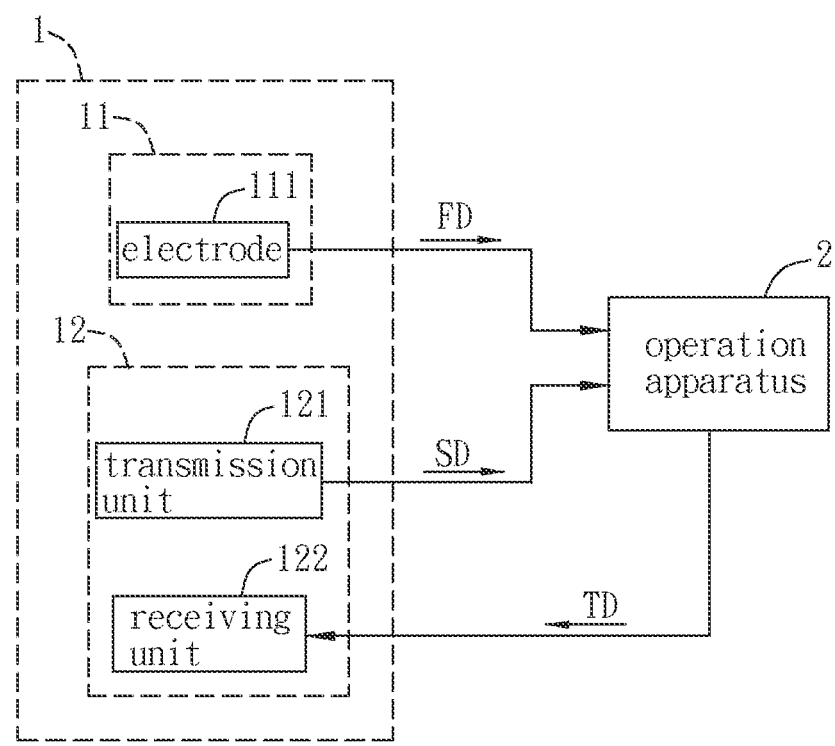
FIG. 1A is a block diagram showing a data transmission system according to a preferred embodiment of the invention.
Figure 1B:
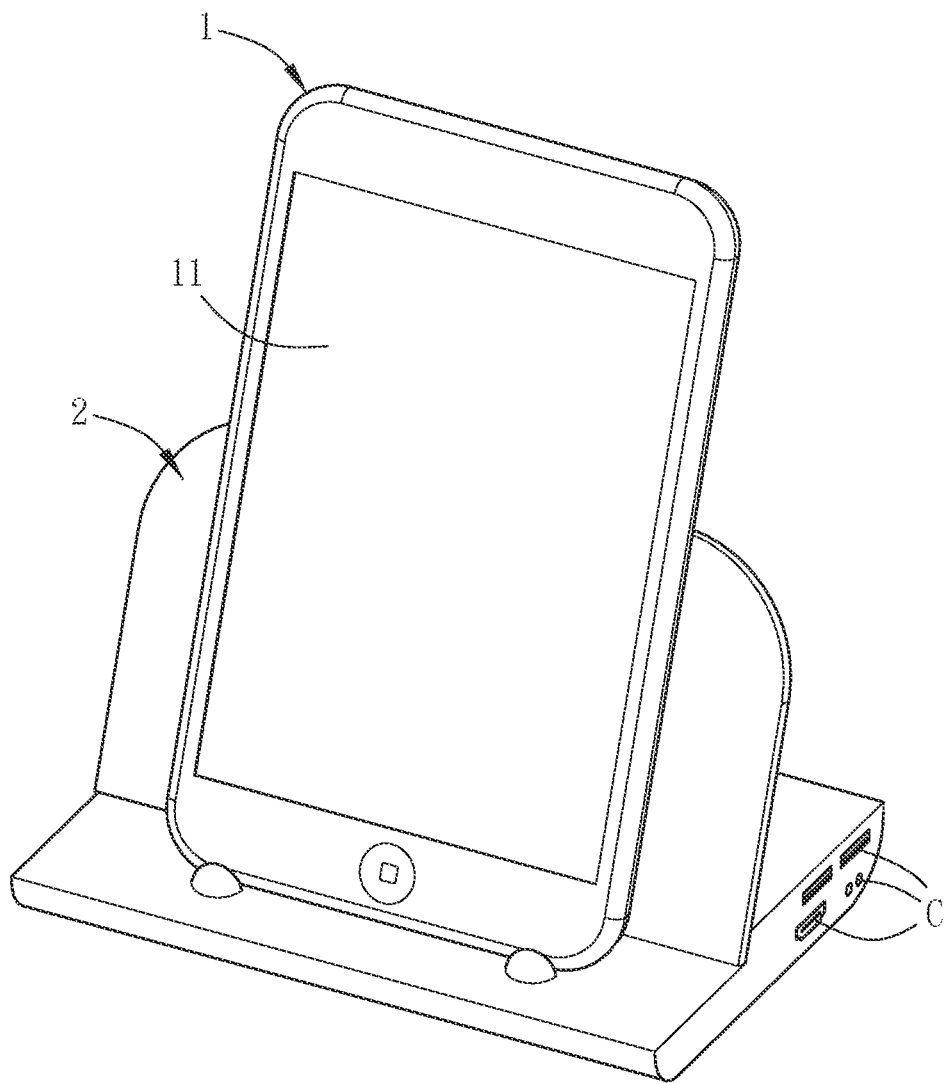
FIG. 1B is a schematic diagram showing the data transmission system according to the preferred embodiment of the invention.

FIG. 1A is a block diagram showing a data transmission system according to a preferred embodiment of the invention, and FIG. 1B is a schematic diagram showing the data transmission system according to the preferred embodiment of the invention.

Referring to FIGS. 1A and 1B, the data transmission system includes an electronic apparatus 1 and an operation apparatus 2, which are coupled to each other. The electronic apparatus 1 and the operation apparatus 2 can be electrically coupled by wire or wireless coupling so as to establish the transmission route therebetween for transmitting data or file. Each of the electronic apparatus 1 and the operation apparatus 2 may include a process control system, a storage system and/or a transmission system. Herein, these systems can be composed of hardware, software, firmware, or their combinations.

The electronic apparatus 1 has an independent CPU and an independent operation system, so it can be individually operated. The operation apparatus 2 can be a passive apparatus, or it may also have an independent CPU and an independent operation system and thus can be individually operated. In this case, the electronic apparatus 1 is, for example, a cell phone, a tablet computer, a public information display, a billboard, an electronic white board, or a PDA, while the operation apparatus 2 is, for example, a docking station, a cell phone, a tablet computer, a personal computer, a user (especially the user's hand), or a PDA. In this embodiment, as shown in FIG. 1B, the electronic apparatus 1 is a tablet computer, while the operation apparatus 2 is a docking station for connecting with the tablet computer by physical connection through electronic connectors. Besides, the operation apparatus 2 may include a user cooperating with (by wearing or holding) a receiving device, so that the user can serve as a medium for transmitting signals.

With reference to FIG. 1A, the electronic apparatus 1 includes a display panel 11 and a transceiver module 12. The display panel 11 is an LCD panel or an OLED display panel, and the transceiver module 12 is, for example, disposed at one side of the electronic apparatus 1 away from the display panel 11 (e.g. the back side of the electronic apparatus 1). The transceiver module 12 includes a transmitting unit 121 and a receiving unit 122. The operation apparatus 2 may further have another transceiver module (not shown), which also includes a transmitting unit and a receiving unit. Herein, the electronic apparatus 1 further includes another transceiver module, and the additional transceiver modules of the electronic apparatus 1 and the operation apparatus 2 may be the long distance communication modules such as a wire/wireless local area network module (e.g. WI-FI or WLAN), a Bluetooth module, a telecommunication network module, an RF module, or their combinations. This invention is not limited thereto. To be noted, the transceiver module of this disclosure is defined by its function. For example, regarding the transceiver module 12 and another transceiver module, which have different functions, they can be integrated into a single transceiver module, and this aspect and the likes are involved in the scope of the invention.

The display panel 11 has at least one electrode 111 and a pixel matrix, which is an active matrix or a passive matrix. Besides, the display panel 11 includes a plurality of row electrodes (e.g. scan lines, not shown), a plurality of column electrodes (e.g. data lines, not shown), and a plurality of pixel electrodes, and the row electrodes and the column electrodes are intersected. Moreover, the display panel 11 may further include a plurality of transistors (not shown), which are electrically connected with the row electrodes, column electrodes and pixel electrodes. In this embodiment, the electrode 111 is an independent electrode on the display panel 11, or one of the row or column electrodes, and this invention is not limited. The electronic apparatus 1 may output a first data FD through the electrode 111 of the display panel 11 by electromagnetic coupling (e.g. capacitive or inductive coupling). When the operation apparatus 2 is operated on the display surface of the display panel 11, the first data FD is coupled from the electrode 111 of the display panel 11 of the electronic apparatus 1 to the operation apparatus 2. Herein, the first data FD is an encoded signal, which may contain the coordinates of the display screen or other data or files to be transmitted. The coupling between the electronic apparatus 1 and the operation apparatus 2 is typically wireless coupling so as to perform a near field signal transmission. Of course, in other applications, the first data FD may be composed of any information to be transmitted such as touch input information, instruction information, identification information, financial transaction information, or file information (e.g. music, picture, text, and etc.).

The first data FD is applied to the electrode 111 of the display panel 11, and the data signal for displaying is additionally applied to the display panel 11 for displaying image. The first data FD can be applied during the blanking time of the display data signals. For example, the first data FD can be applied between two frames or scan operations of two row electrodes, or during the gap generated by shrinking the time of the display signals. Or, the first data FD can have a higher frequency and be directly added to the display signal.

In addition, the electronic apparatus 1 further includes a control module (not shown), which is electrically coupled with the display panel 11 and the transceiver module 12. The control module includes the core control element of the electronic apparatus 11. For example, the control module may include at least one CPU and a memory, or be configured with other control hardware, software or firmware for driving and controlling all actions of the electronic apparatus 1.

In the data transmission system of the invention, the information exchange between the electronic apparatus 1 and the operation apparatus 2 is performed by at least one of the following ways: the operation apparatus 2 couples and receives a first data FD transmitted from the electrode 111, the transmission unit 121 delivers a second data SD from the electronic apparatus 1 to the operation apparatus 2, and the receiving unit 122 receives a third data TD transmitted from the operation apparatus 2.

In other words, when the operation apparatus 2 approaches or touches the electronic apparatus 1, the first data FD of the electronic apparatus 1 is transmitted from the electrode 111 of the display panel 11 to the operation apparatus 2 through signal coupling, or the second data SD of the electronic apparatus 1 is transmitted from the transmission unit 121 to the operation apparatus 2, or the receiving unit 122 of the electronic apparatus 1 receives the third data TD transmitted from the operation apparatus 2. Herein, the third data TD may be inputted to the operation apparatus 2 from other apparatuses or stored in the operation apparatus 2. Accordingly, the first data FD, the second data SD and the third data TD have different transmission routes, so their transmissions are not affected or interfered by one another. In other words, these three kinds of data can be transmitted simultaneously or not, the transmission orders thereof can be optionally changed, and the transmission contents and signal types thereof can be the same or different. Besides, the operation apparatus 2 can process the received first data FD or the received second data SD to obtain the third data TD. If necessary, the third data TD can be fed back to the electronic apparatus 1 and received by the receiving unit 122 of the electronic apparatus 1. For example, when a picture is transmitted from the electronic apparatus 1 to the operation apparatus 2, the electronic apparatus 1 can encode the picture in advance, and then couple the encoded signal to the operation apparatus 2 through the electrode 111 of the display panel 11, so that the operation apparatus 2 can receive the encoded signal to obtain the picture. Or, the electronic apparatus 1 can transmit the picture to the operation apparatus 2 through the transmission unit 121. Although the transmission routes and the transmitted signals are different, the operation apparatus 2 can get the same picture in either way. After the operation apparatus 2 receives the picture, it can return, for example, response information to the receiving unit 122 of the electronic apparatus 1, thereby informing the electronic apparatus 1 of safe receiving of the picture. In addition, the electronic apparatus 1 may divide the data into a first part and a second part, and then transmit the first part and the second part to the operation apparatus 2 through the electrode 111 of the display panel 11 and the transmission unit 121, respectively. Afterwards, the operation apparatus 2 can combine the received first and second parts to obtain the complete data. This invention is not limited to the above transmission methods.

Referring to FIG. 1B, the operation apparatus 2 has at least one signal transmission terminal C, which includes a dock connector, an HDMI connector, a mini display port, a USB, a micro USB, an AV connector, a power input terminal, or any of their combinations, for connecting other peripheral apparatuses. For example, the dock connector has 30 pins and is fitting to iPad or iPhone (Apple Computer Inc.). Accordingly, the operation apparatus 2 may be connected to an input/output device, such as a mouse, keyboard, printer, or other data generating or receiving device, through the signal transmission terminal C for extending the functions of the electronic apparatus 1. Of course, the electronic apparatus 1 may also have the above signal transmission terminal for physical connecting (wire connecting) to the operation apparatus 2 or other peripheral electronic apparatuses.

In other embodiments, the operation apparatus 2 may include a user and another electronic apparatus (not shown). When the user's hand approaches or touches the display surface of the display panel 11 of the electronic apparatus 1 and the additional electronic apparatus simultaneously, the first data FD can be transmitted to the additional electronic apparatus. In other words, the user can serve as a conductor or medium for transmitting data to other electronic apparatuses. In practice, the user's right hand operates on the display surface of the display panel 11, and the user's left hand touches the additional electronic apparatus. Accordingly, the signal enters the user body from the user's right hand and then leaves through the user's left hand. That is, the user's body is the transmission medium of the signal.

Figure 2:
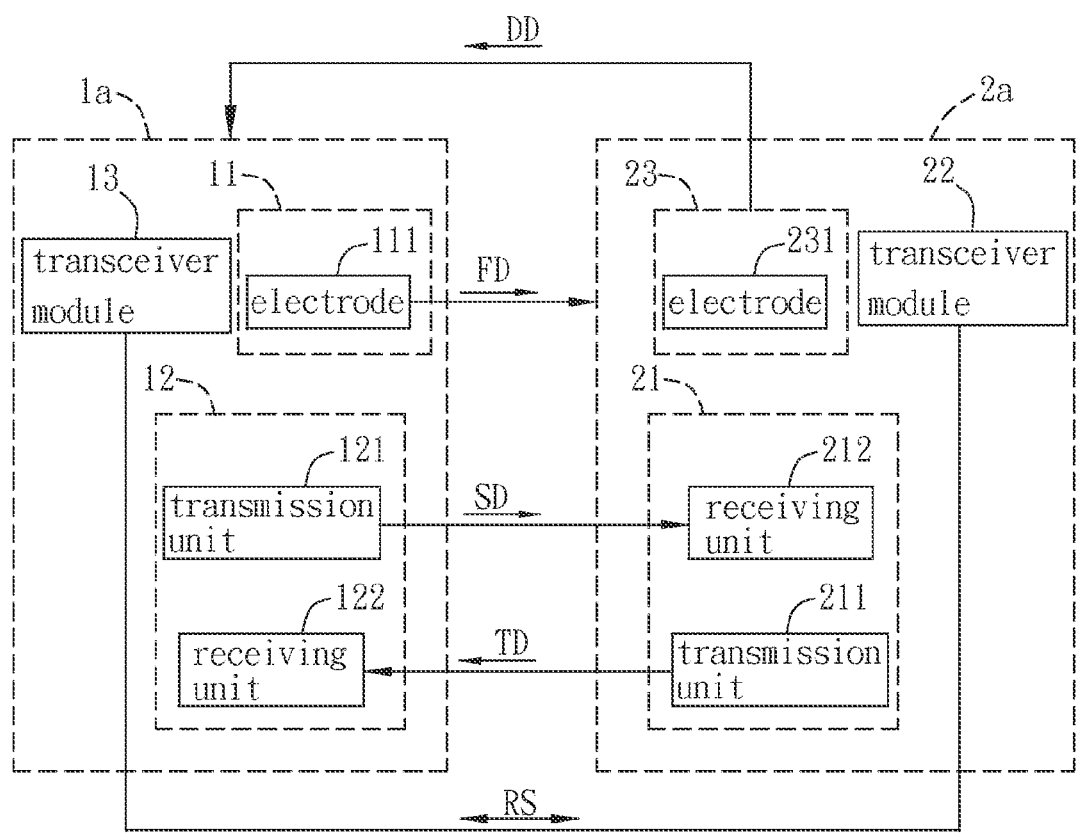
FIGS. 2 and 3 are block diagrams showing a data transmission system according to another preferred embodiment of the invention.

FIG. 2 is a block diagram showing a data transmission system according to another preferred embodiment of the invention.

Different from the data transmission system of FIG. 1A, the operation apparatus 2a of the data transmission system of FIG. 2 includes two transceiver modules 21 and 22 and a display panel 23, and the electronic apparatus 1a further includes an additional transceiver module 13. In this case, the operation apparatus 2a is a cell phone for example, and each of the transceiver modules 22 and 13 may includes a wire/wireless local area network module, a Bluetooth module, a telecommunication network module, an RF module, or their combinations for transmitting data or files.

The transceiver module 21 of the operation apparatus 2a includes a transmission unit 211 and a receiving unit 212. The receiving unit 212 of the operation apparatus 2a receives the second data SD outputted from the transmission unit 121 of the electronic apparatus 1a, and the receiving unit 122 of the electronic apparatus 1a receives the third data TD outputted from the transmission unit 211 of the operation apparatus 2a, thereby achieving the desired near field transmission of data or files. Besides, the additional transceiver module 22 of the operation apparatus 2a and the additional transceiver module 13 of the electronic apparatus 1a are long distance communication modules for performing a long distance data exchange. For example, the transceiver module 13 of the electronic apparatus 1a uploads a file or data to a cloud apparatus, and then the operation apparatus 2a connects to the cloud apparatus for downloading the uploaded file or data through the transceiver module 22. As a result, the desired long distance data exchange can be carried out.

Moreover, the display panel 23 of the operation apparatus 2a includes at least one electrode 231, which can couple a transmission data DD to the electronic apparatus 1a (the electronic apparatus 1a receives the transmission data DD). When the operation apparatus 2a receives the first data FD from the electrode 111 of the electronic apparatus 1a, the transmission data DD can be a response signal with respect to the first data FD. Or, when the operation apparatus 2a receives the second data SD from the electronic apparatus 1a, the third data TD or the transmission data DD can be a response signal with respect to the second data SD. Herein, the response signal can be for informing the receiving status of the operation apparatus 2a to the electronic apparatus 1a, or announcing the operation apparatus 2a to get ready for receiving the signal, or synchronizing the operation apparatus 2a and the electronic apparatus 1a. This configuration can create an interactive mechanism between the transmitting and receiving signals. Moreover, the response signal RS can provide synchronization for establishing an information handshaking process between the operation apparatus 2a and the electronic apparatus 1a. Besides, when the first data FD contains the coordinates of the operation apparatus 1a with respect to the display screen, the third data TD and the transmission data DD contains the coordinate information (e.g. the touch input information).

In the following, an advertisement system will be used as an example to illustrate the data transmission system of FIG. 2. In this case, the electronic apparatus 1a is a large-size public information display, which can provide hotel or restaurant information in the airport or train station to customers or tourists, while the operation apparatus 2a is a cell phone, a tablet computer or any of other portable personal electronic apparatus.

The electronic apparatus 1a can provide information of hotels or restaurants nearby the airport, train station or other areas and the display panel 11 (or the transmission unit 121) of the electronic apparatus 1a is used as the transmission medium. When the target is found, the user can use the transceiver module 21 of the operation apparatus 2a (e.g. the cell phone, tablet computer or other portable personal electronic apparatuses) to approach or touch the public information display (the display panel 11) for coupling and downloading the first data FD (e.g. address, map, coupon, QR code, picture, video, animation, text description, and the likes) from the display panel 11, or the second data SD from the transmission unit 121 of electronic apparatus 1a. After successful downloading the desired information, the transmission data DD (the response information) is transmitted to the electronic apparatus 1a through at least one electrode 231 of the display panel 23 of the operation apparatus 2a. Or, the third data TD, the response information, is transmitted to the receiving unit 122 through the transmission unit 211 of the transceiver module 21 of the operation apparatus 2a, thereby finishing the complete transmitting and receiving procedure. Alternatively, when the user arrives another location, it is also possible to transmit the response data RS to the cloud through the transceiver module 22 of the operation apparatus 2a so as to inform the electronic apparatus 1a and the electronic apparatus 1a receives the response data RS from the cloud through the transceiver module 13.

Another example is the process of buying goods and checkout. Regarding the transaction, the user can carry the transceiver module 21 of the operation apparatus 2a to approach or touch the transmission unit 121 (or display panel 11) of the electronic apparatus 1a so as to receive the requested product information (the second data SD or the first data FD) in advance, and then go to the check-out counter to send the order information (the third data TD or the transmission data DD) to an electronic apparatus, which may be an electronic apparatus other than the electronic apparatus 1a, for finishing the ordering procedure. That is, as the transceiver module 21 of the operation apparatus 2a approaches or touches the transmission unit 121 (or the display panel 11) of the electronic apparatus 1a, the desired information such as the advertising information, discount information, location information, and the likes, can be transmitted to the cell phone, tablet computer or any of other portable personal electronic apparatuses. Afterwards, the user can follow the same information exchange procedure to use the operation apparatus 2a for transmitting the corresponding order information (the third data TD or the transmission data DD) to the receiving unit 122 or transceiver module 13 of the electronic apparatus 1a or other electronic apparatuses 1a with the same information exchange function. Finally, after the transaction procedure has been finished, the electronic apparatus 1a can announce the customer that this order has been complete through the transceiver module 13 of the electronic apparatus 1a and the transceiver module 22 of the operation apparatus 2a.

Figure 3:
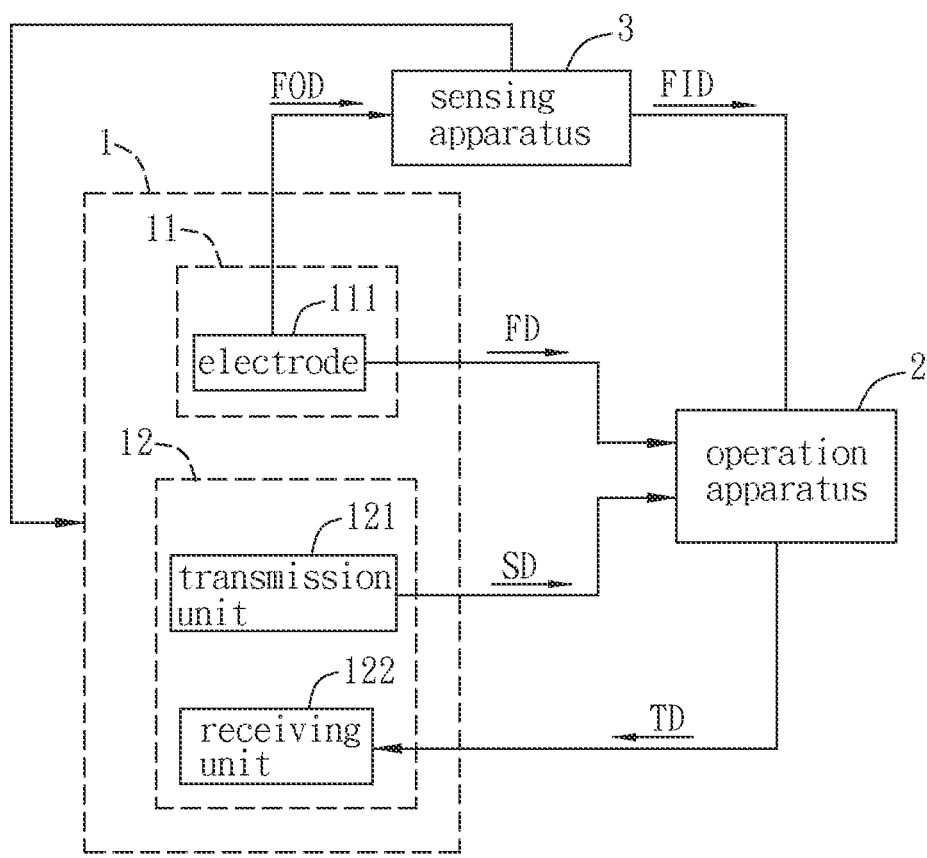

FIG. 3 is a block diagram showing a data transmission system according to another preferred embodiment of the invention.

Different from the data transmission system of FIG. 1A, the data transmission system of FIG. 3 further includes a sensing apparatus 3. When a user operates on the display panel 11 of the electronic apparatus 2, a fourth data FOD is coupled to the sensing apparatus 3 through the user's skin. Herein, the sensing apparatus 3 can be a bracelet worn on the user's wrist. As the user wears the bracelet (the sensing apparatus 3) and operates on the display panel 11, the electronic apparatus 1 can couple or transmit the fourth data FOD to the sensing apparatus 3. The bracelet (the sensing apparatus 3) is configured with the processing circuit for processing the fourth data FOD to obtain a fifth data FID, which is transmitted to the electronic apparatus 1 or the operation apparatus 2 later through the bracelet (the sensing apparatus 3). In this case, FIG. 3 shows that the fifth data FID is transmitted to the operation apparatus 2.

The other technical features of the data transmission systems of FIGS. 2 and 3 can be referred from the data transmission system of FIG. 1A, so the detailed description thereof will be omitted.

As mentioned above, the information exchange between the electronic apparatus and the operation apparatus of the invention is performed by at least one of the following ways: the operation apparatus couples and receives a signal outputted from the electrode of the display panel so as to obtain a first data, the transmission unit delivers a second data from the electronic apparatus to the operation apparatus, and the receiving unit receives a third data transmitted from the operation apparatus. Accordingly, a near field wireless data transmission, which can be applied to not only the near field transmission of data or file but also the far distance data transmission by cooperating with the current communication system, is provided. In one embodiment of the invention, the electronic apparatus of this architecture can transmit data or file to another electronic apparatus within a short distance through signal coupling and then implement the desired data transmission by other communication approaches, thereby expending the application fields of the electronic apparatus.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electronic apparatus cooperated with an operation apparatus, comprising:
    an active matrix display panel having plural row electrodes, column electrodes and pixel electrodes for displaying image;
    wherein, information exchange between the electronic apparatus and the operation apparatus is performed by the following way: the operation apparatus wirelessly couples and receives a first data other than display data transmitted from at least one electrode of the row electrodes and the column electrodes of the active matrix display panel.

2. The electronic apparatus of claim 1, wherein at least one of the operation apparatus and the electronic apparatus has another transceiver module, which comprising a wire or wireless local area network module, or a Bluetooth module, or a telecommunication network module, or an RF (radio frequency) module, or their combinations.

3. The electronic apparatus of claim 1, wherein the operation apparatus has another display panel, and a transmission data is coupled to a transceiver module of the electronic apparatus from at least an electrode of the another display panel.

4. The electronic apparatus of claim 1, wherein the electronic apparatus comprises a cell phone, a tablet computer, a public information display, a billboard, an electronic white board, or a Personal Digital Assistant (PDA).

5. The electronic apparatus of claim 1, further comprising a transceiver module having a transmission unit and a receiving unit, wherein information exchange between the electronic apparatus and the operation apparatus is performed by at least one of the following ways:
the transmission unit delivers a second data from the electronic apparatus to the operation apparatus; and
the receiving unit receives a third data transmitted from the operation apparatus.

6. The electronic apparatus of claim 5, wherein when the operation apparatus approaches or touches the electronic apparatus, the first data is transmitted from the electrode of the active matrix display panel to the operation apparatus, or the second data is transmitted from the transmission unit to the operation apparatus.

7. A data transmission system, comprising:
an operation apparatus; and
an electronic apparatus comprising an active matrix display panel, wherein the active matrix display panel has plural row electrodes, column electrodes and pixel electrodes for displaying image;
wherein, information exchange between the electronic apparatus and the operation apparatus is performed by the following way:
the operation apparatus wirelessly couples and receives a first data other than display data transmitted from at least one electrode of the row electrodes and the column electrodes of the active matrix display panel.

8. The data transmission system of claim 7, wherein at least one of the operation apparatus and the electronic apparatus has another transceiver module, which comprising a wire or wireless local area network module, or a Bluetooth module, or a telecommunication network module, or an RF (radio frequency) module, or their combinations.

9. The data transmission system of claim 7, wherein the operation apparatus has at least a signal transmission terminal, which comprises a dock connector, an HDMI (High-Definition Multimedia Interface) connector, a mini display port, a Universal Serial Bus (USB), a micro USB, an AV (Audio/Video) connector, a power input terminal, or any of their combinations.

10. The data transmission system of claim 7, wherein the operation apparatus comprises an independent CPU (central processing unit) and an independent operation system.

11. The data transmission system of claim 7, further comprising:
a sensing apparatus, wherein when a user operates on the active matrix display panel, a fourth data is coupled to the sensing apparatus through the user.

12. The data transmission system of claim 11, wherein the sensing apparatus delivers a fifth data to the electronic apparatus or the operation apparatus.

13. The data transmission system of claim 7, wherein the operation apparatus comprises a docking station, a cell phone, a tablet computer, a personal computer, a user, or a Personal Digital Assistant (PDA).

14. The data transmission system of claim 7, wherein the electronic apparatus comprises a cell phone, a tablet computer, a public information display, a billboard, an electronic white board, or a PDA.

15. The data transmission system of claim 7, wherein the electronic apparatus further comprises a transceiver module having a transmission unit and a receiving unit, wherein information exchange between the electronic apparatus and the operation apparatus is performed by at least one of the following ways:
the transmission unit delivers a second data from the electronic apparatus to the operation apparatus; and
the receiving unit receives a third data transmitted from the operation apparatus.

16. The data transmission system of claim 15, wherein when the operation apparatus approaches or touches the electronic apparatus, the first data is transmitted from the electrode of the active matrix display panel to the operation apparatus, or the second data is transmitted from the transmission unit to the operation apparatus.

17. The data transmission system of claim 15, wherein the operation apparatus has another display panel, and a transmission data is coupled to the transceiver module of the electronic apparatus from at least an electrode of the another display panel.

18. The data transmission system of claim 7, wherein the electronic apparatus further comprising a transceiver module having a transmission unit, wherein information exchange between the electronic apparatus and the operation apparatus is performed by:
the transmission unit delivers a second data from the electronic apparatus to the operation apparatus;
wherein the electronic apparatus divides a source data into a first part and a second part, the first data is the first part, and the second data is the second part;
wherein the operation apparatus receives the first data transmitted from at least one electrode of the row electrodes and the column electrodes of the active matrix display panel, receives the second data transmitted from the transmission unit of the electronic apparatus, and combines the received first data and the received second data to obtain the source data.

19. The data transmission system of claim 7, wherein the operation apparatus further comprises a second display panel and the second display panel further comprises at least one operational electrode;
wherein, in response to the received first data, the operation apparatus transmits a data from the operational electrode of the second display panel to synchronize the subsequent transmission between the electronic apparatus and operation apparatus.

* * * * *